(12) United States Patent
Lacroix et al.

(10) Patent No.: US 11,054,907 B2
(45) Date of Patent: *Jul. 6, 2021

(54) FRICTION MODULATION FOR THREE DIMENSIONAL RELIEF IN A HAPTIC DEVICE

(71) Applicant: Immersion Corporation, San Jose, CA (US)

(72) Inventors: Robert Lacroix, San Jose, CA (US); Vincent Levesque, Montreal (CA)

(73) Assignee: Immersion Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,810

(22) Filed: Apr. 10, 2020

(65) Prior Publication Data

US 2020/0272238 A1   Aug. 27, 2020

Related U.S. Application Data

(63) Continuation of application No. 15/807,687, filed on Nov. 9, 2017, now Pat. No. 10,649,530, which is a
(Continued)

(51) Int. Cl.
*G06F 3/01* (2006.01)
*G06F 3/0488* (2013.01)
(Continued)

(52) U.S. Cl.
CPC .............. *G06F 3/016* (2013.01); *G06F 3/041* (2013.01)

(58) Field of Classification Search
CPC .... G06F 3/016; G06F 3/0488; G06F 3/04886; G06F 3/04883; G06F 3/0481; G06F 3/041
See application file for complete search history.

(56) References Cited

U.S. PATENT DOCUMENTS 5,999,185 A * 12/1999 Kato ...................... G06F 3/011
                                                         345/420
6,496,200 B1   12/2002 Snibbe et al.
(Continued)

FOREIGN PATENT DOCUMENTS

CN   103970267   8/2014
EP     2759915   7/2014
(Continued)

OTHER PUBLICATIONS

Barry Richardson, Mark Symmons, and Dianne Wuillemin, "The Contribution of Virtual Reality to Research on Sensory Feedback in Remote Control", Virtual Reality, vol. 9 pp. 234-242, in Mar. 2006, retrieved from web on Jul. 19, 2020 at https://link.springer.com/article/10.1007/s10055-006-0020 (Year: 2006).*

(Continued)

*Primary Examiner* — Shourjo Dasgupta
(74) *Attorney, Agent, or Firm* — Kilpatrick Townsend & Stockton LLP

(57) ABSTRACT

A haptic device includes a display configured to display an image, a haptic output device configured to generate a haptic effect to a user when the user interacts with the display, and a processor configured to receive information related to the image displayed on the display. The processor is also configured to create a friction based haptic effect map associated with the image displayed on the display, and generate a signal to the haptic output device to output the haptic effect when the user interacts with the display when the image is displayed on the display, the haptic effect being configured to simulate a feel of the image in three dimensions.

20 Claims, 18 Drawing Sheets

Related U.S. Application Data continuation of application No. 13/793,843, filed on Mar. 11, 2013, now Pat. No. 9,880,623.

(60) Provisional application No. 61/756,355, filed on Jan. 24, 2013.

(51) Int. Cl.
*G06F 3/0481* (2013.01)
*G06F 3/041* (2006.01)

(56) References Cited

U.S. PATENT DOCUMENTS

| | | | |
|---|---|---|---|
| 6,650,338 | B1 | 11/2003 | Kolarov et al. |
| 8,294,557 | B1 | 10/2012 | El Saddik et al. |
| 9,880,623 | B2 | 1/2018 | Lacroix et al. |
| 2004/0196282 | A1 | 10/2004 | Oh et al. |
| 2005/0264527 | A1 | 12/2005 | Lin |
| 2007/0035511 | A1* | 2/2007 | Banerjee ............ G06F 3/011 345/156 |
| 2008/0143895 | A1* | 6/2008 | Peterka ............ H04N 13/31 349/15 |
| 2009/0179866 | A1 | 7/2009 | Agevik et al. |
| 2009/0251421 | A1 | 10/2009 | Bloebaum |
| 2010/0231367 | A1 | 9/2010 | Cruz-Hernandez et al. |
| 2010/0231508 | A1 | 9/2010 | Cruz-Hernandez et al. |
| 2010/0231539 | A1 | 9/2010 | Cruz-Hernandez et al. |
| 2010/0231540 | A1 | 9/2010 | Cruz-Hernandez et al. |
| 2010/0231541 | A1 | 9/2010 | Cruz-Hernandez et al. |
| 2010/0231550 | A1 | 9/2010 | Cruz-Hernandez et al. |
| 2011/0157088 | A1 | 6/2011 | Motomura et al. |
| 2011/0304500 | A1 | 12/2011 | Himmelstoss et al. |
| 2011/0304550 | A1 | 12/2011 | Romera Jolliff et al. |
| 2012/0120069 | A1 | 5/2012 | Kodaira et al. |
| 2012/0206390 | A1 | 8/2012 | Ueno et al. |
| 2012/0236930 | A1 | 9/2012 | Gavade et al. |
| 2012/0268412 | A1 | 10/2012 | Cruz-Hernandez et al. |
| 2012/0327006 | A1* | 12/2012 | Israr ............ G06F 3/016 345/173 |
| 2012/0327100 | A1 | 12/2012 | Shih et al. |
| 2013/0021288 | A1* | 1/2013 | Karkkainen ........ G06F 3/03545 345/173 |
| 2013/0109371 | A1 | 5/2013 | Brogan et al. |
| 2013/0222280 | A1* | 8/2013 | Sheynblat ............ G06F 3/016 345/173 |
| 2013/0300740 | A1* | 11/2013 | Snyder ............ G06F 3/016 345/420 |
| 2013/0300749 | A1 | 11/2013 | Harada et al. |
| 2013/0321431 | A1* | 12/2013 | Chen ............ G09B 29/007 345/473 |
| 2013/0321472 | A1* | 12/2013 | Piemonte ............ G06F 1/1626 345/672 |
| 2014/0015826 | A1 | 1/2014 | Licata |
| 2014/0062927 | A1* | 3/2014 | Hirose ............ G06F 3/016 345/173 |
| 2014/0071117 | A1* | 3/2014 | Schuckle ............ G06F 3/0416 345/419 |
| 2014/0118127 | A1 | 5/2014 | Levesque et al. |
| 2014/0176535 | A1 | 6/2014 | Krig et al. |
| 2014/0184591 | A1 | 7/2014 | Boschker et al. |
| 2014/0208204 | A1 | 7/2014 | Lacroix et al. |
| 2014/0254912 | A1 | 9/2014 | Noyel et al. |
| 2017/0236930 | A1 | 8/2017 | Sun et al. |
| 2018/0067560 | A1 | 3/2018 | Lacroix et al. |

FOREIGN PATENT DOCUMENTS

| | | |
|---|---|---|
| EP | 2759915 | 10/2016 |
| JP | 0561970 A | 3/1993 |
| JP | 2004310518 A | 11/2004 |
| JP | 2012181833 | 9/2012 |
| JP | 2014142930 | 8/2014 |
| JP | 6373588 | 7/2018 |
| KR | 10-2011-0062099 A | 6/2011 |
| KR | 1020140095432 | 8/2014 |

OTHER PUBLICATIONS

"Haptics in Augmented Reality", published to web on Nov. 18, 2012 at https://pdfs.semanticscholar.org/cedd/7f05cfeaedef8bfe375d78040d0337ad261f.pdf, retrieved on Jul. 19, 2020 (Year: 2012).*
Olivier Bau and Ivan Poupyrev, "REVEL: Tactile Feedback Technology for Augmented Reality", ACM TranS. Graph. 31 vol. 4, Article 89 (published Jul. 2012), retrieved on Jul. 19, 2020 from http://www.ivanpoupyrev.com/wp-content/uploads/2015/11/REVELsiggraph.pdf (Year: 2012).*
Bruce Sterling, "Augmented Reality: Haptic Augmented Reality", published on May 24, 2010 to https://www.wired.com/2010/05/augmented-reality-haptic-augmented-reality, retrieved on Jul. 19, 2020 (Year: 2010).*
CN201410035071.5, "Notice of Decision to Grant", dated Oct. 29, 2018, 2 pages.
CN201410035071.5, "Office Action", dated Sep. 25, 2017, 26 pages.
CN201410035071.5, "Office Action", dated Jun. 27, 2018, 3 pages.
EP14152550.1, "Extended European Search Report", dated Sep. 7, 2016, 7 pages.
EP14152550.1, "Office Action", dated Apr. 11, 2019, 7 pages.
EP14152550.1, "Summons to Attend Oral Proceedings", Oct. 15, 2019, 8 pages.
JP2014-007522, "Notice of Allowance", dated Jun. 19, 2018, 6 pages.
JP2014-007522, "Office Action", dated Jan. 23, 2018, 6 pages.
JP2014-007522, "Office Action", dated Sep. 5, 2017, 8 pages.
JP2018-135411, "Office Action", dated Apr. 14, 2020, 3 pages.
JP2018-135411, "Office Action", dated May 7, 2019, 8 pages.
KR 10-2014-0007051 Office Action dated 2020—Aug. 2020.
JP 2018-135411 Office Action dated Sep. 15, 2020.

* cited by examiner

FRICTION MODULATION FOR THREE DIMENSIONAL RELIEF IN A HAPTIC DEVICE

CROSS-REFERENCE TO RELATED APPLICATIONS

This application is a continuation of U.S. patent application Ser. No. 15/807,687, filed Nov. 9, 2017 and entitled "Friction Modulation for Three Dimensional Relief in a Haptic Device," which is a continuation of U.S. patent application Ser. No. 13/793,843, filed Mar. 11, 2013 and entitled "Friction Modulation for Three Dimensional Relief In A Haptic Device," and issued as U.S. Pat. No. 9,880,623 on Jan. 30, 2018, which claims priority to U.S. Provisional Patent Application No. 61/756,355, filed on Jan. 24, 2013 and entitled "Friction Modulation for Three Dimensional Relief In A Haptic Device," the entirety of each of which is hereby incorporated by reference.

FIELD

The present invention is related to friction modulation for three dimensional relief in a haptic device.

BACKGROUND

There is an innate human desire to feel the shapes of things, and current touchscreen display devices do not offer that capability in any form. In addition, a static visual view may lead to form ambiguity. In the real-world, people use the sense of touch to disambiguate the shapes of objects.

SUMMARY

It is desirable for a user of an electronic device having a display to be able to touch the display and feel the contours of an image on the display. The image may be an inanimate object or an animate object, such as a person's face or hand.

According to an aspect of the invention, there is provided a haptic device that includes a display configured to display an image, a haptic output device configured to generate a haptic effect to a user when the user interacts with the display, and a processor configured to receive information related to the image displayed on the display, create a friction based haptic effect map associated with the image displayed on the display, and generate a signal to the haptic output device to output the haptic effect when the user interacts with the display when the image is displayed on the display, the haptic effect being configured to simulate a feel of the image in three dimensions.

According to an aspect of the invention, there is provided a method that includes receiving information related to an image displayed on a display; creating a friction based haptic effect map associated with the image displayed on the display, the haptic effect map being representative of three dimensional features of the image; and outputting a haptic effect when a user interacts with the display while the display is displaying the image, the haptic effect simulating a feel of the image in three dimensions.

According to an aspect of the invention, there is provided a system that includes a touchscreen video display comprising a haptic output device. The touchscreen video display is configured to receive a video signal, display an image based on the video signal, and output a haptic effect. The system includes a processor configured to receive information related to the image displayed on the display, create a friction based haptic effect map associated with the image displayed on the display, and generate a signal to the haptic output device to output the haptic effect when the user interacts with the display when the image is displayed on the display. The haptic effect is configured to simulate a feel of the image in three dimensions.

According to an aspect of the invention, there is provided a method that includes receiving a video stream comprising images; analyzing the video stream and approximating three-dimensional shapes of the images being received in the video stream; and generating haptic effects based on the three-dimensional shapes of the images.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

and

Figure 18:
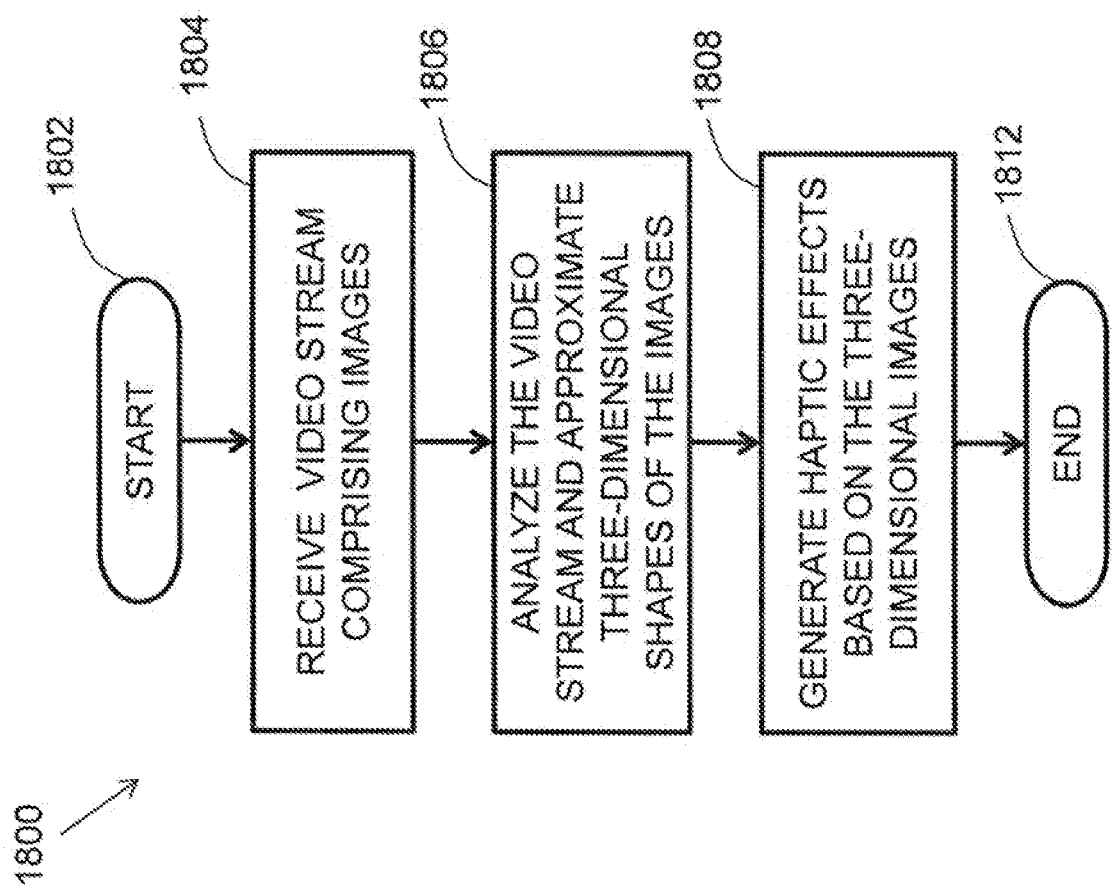

FIG. 18 is a flow diagram of a method according to an embodiment of the invention.

DETAILED DESCRIPTION

The present disclosure describes embodiments of haptic devices that include haptic output devices that impose haptic effects on a user via a user interface, human-computer interface, or other portions of a user device. In particular, the embodiments of the haptic devices described herein can be configured to apply haptic effects to a touch sensitive surface of a user device. The touch sensitive surface, in some embodiments, can be part of a display device that may include both a visual output mechanism and a touch sensitive input mechanism. Thus, haptic feedback can be applied in user devices, such as electronic handheld devices, for providing a rich sensory experience for the user.

Although many of the examples described herein relate to touch screen devices, it should be understood that the present disclosure also encompasses other types of human-computer interfaces involving touch sensitive structures. In addition, other features and advantages will be apparent to one of ordinary skill in the art upon reading and understanding the general principles of the present disclosure. These other features and advantages are intended to be included in the present disclosure as well.

Figure 1:
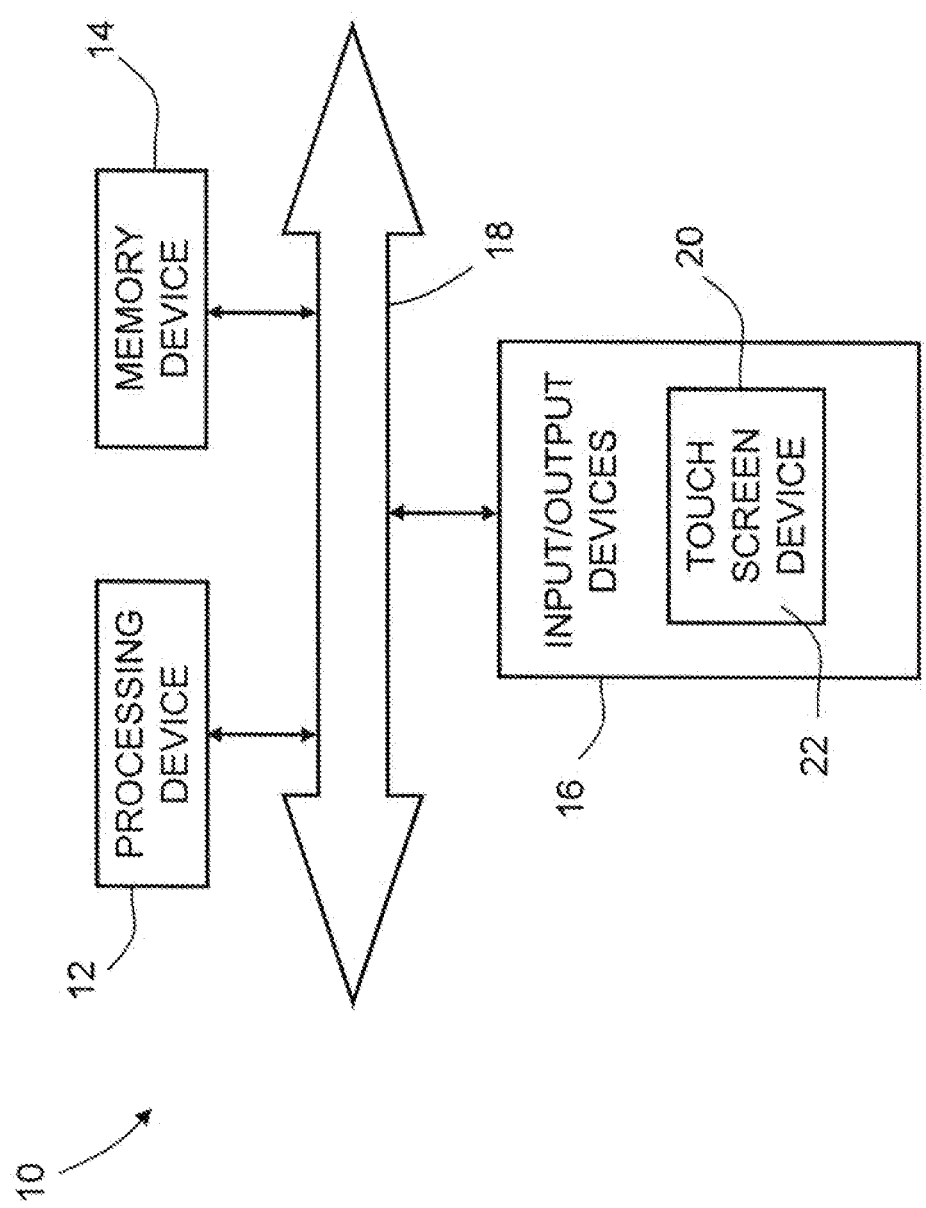
FIG. 1 illustrates a schematic view of an electronic device, according to embodiments of the invention.

FIG. 1 is a block diagram of an electronic device 10 in accordance with an embodiment of the invention. As illustrated, the electronic device 10 includes a processing device (e.g., a processor) 12, a memory device 14, and input/output devices 16, which are interconnected via a bus 18. In an embodiment, the input/output devices 16 may include a touch screen device 20 or other human-computer interface devices.

The touch screen device 20 may be configured as any suitable human-computer interface or touch/contact surface assembly. The touch screen device 20 may be any touch screen, touch pad, touch sensitive structure, computer monitor, laptop display device, workbook display device, kiosk screen, portable electronic device screen, or other suitable touch sensitive device. The touch screen device 20 may be configured for physical interaction with a user-controlled device, such as a stylus, finger, etc. In some embodiments, the touch screen device 20 may include at least one output device and at least one input device. For example, the touch screen device 20 might include a visual display and a touch sensitive screen superimposed thereon to receive inputs from a user's finger. The visual display may include a high definition display screen.

In various embodiments, the touch screen device 20 provides haptic feedback to at least a portion of the electronic device 10, which can be conveyed to a user in contact with the electronic device 10. Particularly, the touch screen device 20 can provide haptic feedback to the touch screen itself to impose a haptic effect when the user in is contact with the screen. The haptic effects can be used to enhance the user experience, and particularly can provide a confirmation to the user that the user has made sufficient contact with the screen to be detected by the touch screen device 20.

The electronic device 10 may be any device, such as a desktop computer, laptop computer, electronic workbook, electronic handheld device (such as a mobile phone, gaming device, personal digital assistant ("PDA"), portable e-mail device, portable Internet access device, calculator, etc.), kiosk (such as an automated teller machine, ticking purchasing machine, etc.), printer, point-of-sale device, game controller, or other electronic device.

The processing device 12 may be a general-purpose or specific-purpose processor or microcontroller for managing or controlling the operations and functions of the electronic device 10. For example, the processing device 12 may be specifically designed as an application-specific integrated circuit ("ASIC") to control output signals to a driver of the input/output devices 16 to provide haptic effects. The processing device 12 may be configured to decide, based on predefined factors, what haptic effects are to be generated, the order in which the haptic effects are generated, and the magnitude, frequency, duration, and/or other parameters of the haptic effects. The processing device 12 can also be configured to provide streaming commands that can be used to drive a haptic output device for providing a particular haptic effect. In some embodiments, the processing device 12 may actually include a plurality of processors, each configured to perform certain functions within the electronic device 10.

The memory device 14 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage devices may include haptic effect profiles, instructions for how the haptic output device of the input/output devices 16 are to be driven, or other information for generating haptic effects.

In addition to the touch screen device 20, the input/output devices 16 may also include specific input mechanisms and output mechanisms. For example, the input mechanisms may include such devices as keyboards, keypads, cursor control devices (e.g., computer mice), or other data entry devices. Output mechanisms may include a computer monitor, virtual reality display device, audio output device, printer, or other peripheral devices. The input/output devices 16 may include mechanisms that are designed to not only receive input from a user, but also provide feedback to the user, such as many examples of touch screen devices. The touch screen device 20 and other input/out devices 16 may include any suitable combination and configuration of buttons, keypads, cursor control devices, touch screen components, stylus-receptive components, or other data entry components. The touch screen device 20 may also include any suitable combination of computer monitors, display screens, touch screen displays, haptic output devices, or other notification devices for providing output to the user.

In an embodiment, the touch screen device 20 includes a display surface 22, which may be rigid, that is configured to modulate its friction properties through, including but not limited to, electrostatic friction or ultra-sonic surface vibration, to give the user a feeling of surface relief (e.g., hills and valleys) when running a finger or stylus across the display that corresponds to the display image.

Figure 2:
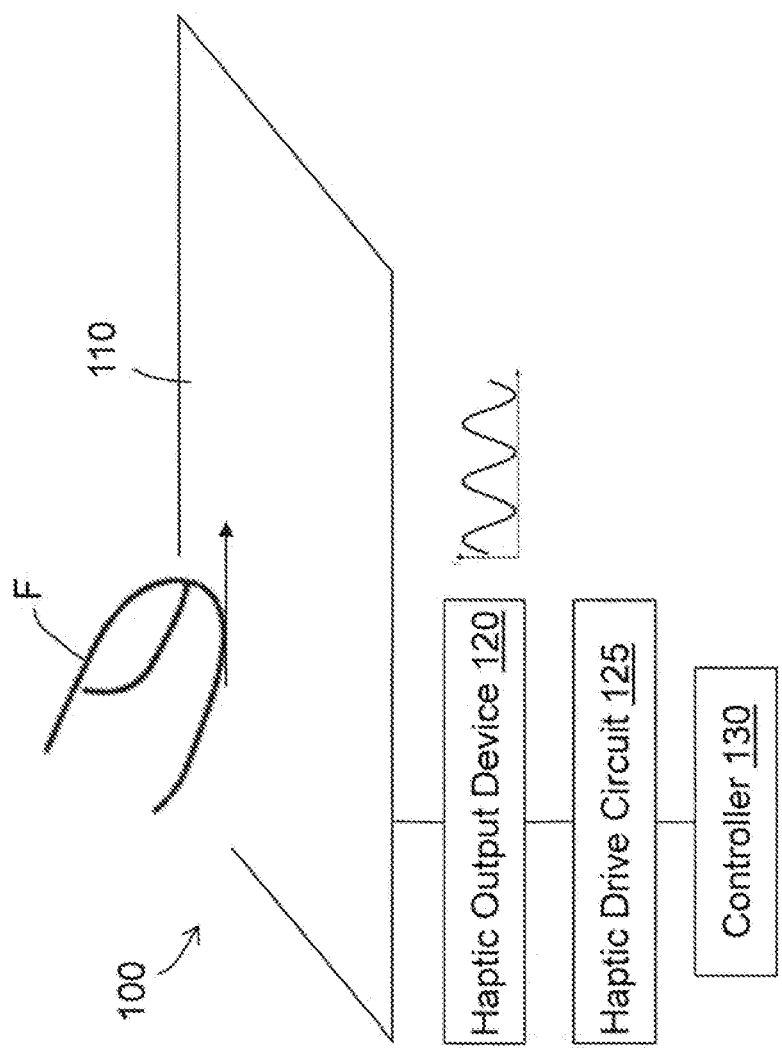
FIG. 2 illustrates a schematic view of a touch screen device of the electronic device of FIG. 1, according to embodiments of the invention.

FIG. 2 illustrates an embodiment of a haptic effect enabled user interface device 100 that may generate a haptic effect at a surface 110 of the device. The surface 110 of the device 100 may be a display surface that is the same as or similar to the display surface 22 of the touch screen device of FIG. 1. The haptic effect may be generated to simulate a feature, such as a surface feature, represented by the device 100. For example, the simulated surface feature may be a simulated texture, spatial pattern, edge or border, or any other tactile sensation, whether natural or artificial, of the surface 110. In an embodiment, the surface 110 may be a touch screen that displays an image corresponding to the simulated surface feature, such as an image of an object having the simulated texture or other tactile sensation. In an embodiment, the surface 110 may be a touch pad that corresponds to a display of the image, or any other touch interface. The device 100 may include a mobile phone, tablet computer, electronic display, touch pad, or any other electronic user interface device.

In an embodiment, the device 100 may comprise a haptic drive module (e.g., controller 130), a haptic output device 120 to generate haptic effects, and a haptic drive circuit 125 operatively coupled to the controller 130 and the haptic output device 120 so as to apply a drive signal to the haptic output device 120. The controller 130 may include one or more processors or any other processing unit and may be part of the processing device 12 of FIG. 1. The haptic output device 120 may include an actuator (e.g., a voice coil, ultrasonic vibration device, solenoid, piezoelectric device, or any other actuator), an electrostatic device, or any other haptic output device. The ultrasonic vibration device may, in some instances, reduce a level of friction at the surface 110. The controller 130 may be operatively coupled to the haptic output device 120, which may be operatively coupled to the surface 110. Haptic output devices are discussed in more detail in U.S. patent application Ser. No. 13/092,269, titled "Electro-vibrotactile Display", filed on Apr. 22, 2011, and published on Oct. 25, 2012 as U.S. Patent Application Publication No. 2012/0268412, the entire content of which is incorporated herein by reference.

In an embodiment, the controller 130, the haptic drive circuit 125, and the haptic output device 120 may simulate surface features at the surface 110 by controlling a level of friction. For example, the haptic output device 120 may include an actuator that may control friction by generating vibrations at the surface 110. The haptic output device 120 may include an electrostatic device that may control a level of friction by applying a voltage to or underneath the surface 110. An alternating voltage signal, for example, may create a capacitive effect that attracts a finger F, a stylus, or any other object at the surface 110. The attractive force at the surface may be perceived as friction as the object moves across the surface. Increasing the attractive force may increase a level of friction at the surface. Controlling friction through a haptic effect is discussed in more detail in U.S. patent application Ser. No. 13/092,269, titled "Electro-vibrotactile Display", filed Apr. 22, 2011, and published on Oct. 25, 2012 as U.S. Patent Application Publication No. 2012/0268412, the entire content of which is incorporated herein by reference.

As described in U.S. Patent Application Publication No. 2012/0268412, an electrostatic device may, in an embodiment, be used with a surface that includes a conductive layer having one or more electrodes and that includes an insulating layer. The conducting layer may be any semiconductor or other conductive material. The insulating layer may be glass, plastic (e.g., thermoplastic), polymer, or any other insulating layer. The electrostatic device may operate by applying an AC signal that, in an embodiment, capacitively couples the conducting layer with an object near or touching surface 110. The AC signal may be generated by a high-voltage amplifier.

The capacitive coupling may control a level of friction on the surface 110. In an embodiment, a texture may be simulated by controlling the level of friction on the surface 110. Varying the levels of attraction between the object and the conducting layer can vary the friction on an object moving across the surface 110. Varying the friction force may simulate one or more textures.

Further, the capacitive coupling may also generate a haptic effect by stimulating parts of the object near or touching the surface 110, such as mechanoreceptors in the skin of a user's finger. In an example, the conducting layer may be applied with an AC voltage signal that couples with conductive parts of a user's finger. As the user moves his or her finger on the screen, the user may sense a texture of prickliness, graininess, bumpiness, roughness, stickiness, or some other texture.

In an embodiment, the surface 110 may not have an insulating layer, so that an object can directly touch the conducting layer. A haptic effect may be generated by applying a voltage from the conducting layer to the object through an electrically conductive path. This embodiment may alternatively use an insulating layer, but include one or more electrodes in the insulating layer that can create an electrically conductive path from the conducting layer to objects that touch the electrode as they move across the insulating layer.

In an embodiment, a haptic effect is not confined to a surface (e.g., surface 110) of an electronic user interface device. In this embodiment, a user's hand, for example, may touch objects beyond a touch screen or touchpad and still perceive a haptic effect. The haptic effect may be generated by, for example, applying a voltage directly to the user's body from a signal generator or any other voltage-generating device. In some instances, the voltage-generating device may be a standalone device adapted to be mounted at a location that frequently comes into contact with the user's body. The voltage may be applied whenever a sensor detects that the user's body is touching an object on which a texture is to be simulated. The voltage may place a charge on the user's body. Capacitive interaction between the charge on the user's body and the object being touched may create an attractive force between the user's body and the object. The force of attraction may control a level of friction at a surface of the object, which may simulate a texture or any other tactile sensation of the object being touched. Varying the voltage being applied to the user's body may vary the haptic effect, and thus vary the tactile sensation being simulated. If the voltage is based on a periodic signal, varying the voltage may include varying the amplitude or frequency of the signal. In some instances, the object may have a conductive layer surrounded by an insulating layer. The capacitive interaction may be between the conductive layer and the charge on the user's body. In some instances, both the object being touched and the voltage generating device may have a common ground. In some instances, the user's body may be grounded. In some instances, the user's body is not grounded.

In an embodiment, a user may perceive a simulated texture on an object both through an electrostatic effect that is generated at a surface of the object and through an augmented reality experience created by an electronic user interface device. For example, the electronic user interface device may create an augmented reality experience by displaying a captured image of an object and overlaying a graphical representation of a texture on the image. In the embodiment, the user may perceive a texture on an object both by touching the object and by seeing the graphical representation of the texture overlaid on the object on the electronic user interface.

In an embodiment, the controller 130 may be configured to cause the haptic output device 120 to generate a periodic haptic effect. FIG. 2, for example, illustrates a periodic haptic effect based on a haptic drive signal 201. In some instances, the haptic drive signal may be a periodic drive signal. In some instances, the haptic drive signals may represent haptic effects generated by the haptic output device 120. For example, if the haptic output device 120 includes an electrostatic device, a haptic effect based on the haptic drive signal 201 may include a sinusoidal AC voltage that has a frequency and amplitude matching or proportional to haptic drive signal 201. If the haptic output device 120 includes an actuator, a haptic effect based on the haptic drive signal 201 may include a vibration that that has a frequency and amplitude matching the haptic drive signal 201. The periodic haptic effect may vary according to a sinusoidal waveform, as illustrated in FIG. 2, a square, triangular, or sawtooth waveform, or any other periodic waveform. For example, a periodic electrostatic effect may be generated by an AC voltage having a sinusoidal, square, triangular, sawtooth, or any other waveform.

In an embodiment, the controller 130 may cause the haptic output device 120 to alter the haptic effect. For example, a frequency of a periodic haptic effect may be altered as the finger F or any other object creating a touch input moves across the surface 110. For example, the haptic drive signal may be altered to have a greater frequency as compared to the haptic drive signal 201 of FIG. 2. In an embodiment, how the haptic effect changes may be based on a location, velocity, acceleration, direction of movement, applied pressure, lateral force, contact area, shape of contact area, angle of approach, orientation, temperature, conductance, or dryness of the object, or based on a system input. In an embodiment, the haptic effect may change based on a simulated contour of the image being displayed through the touch surface, as discussed in further detail below.

In an embodiment, electrostatic friction may be used to provide haptic feedback in the context of a computer-mediated video conference between two persons. As illustrated in FIG. 3(a), the user may be initially presented with a screen that includes an image 300 that includes two contacts, represented by 302 and 304, to choose from. The user may then select one of the contacts by tapping on the corresponding image 302 or 304 on the display screen, which is also part of a touch screen device, such as the touch screen device 20 discussed above. An image representing the remote contact is then shown onscreen, such as an image of a hand of a toddler 310, as shown in FIG. 3b, or an image of a partial face 320, as shown in FIG. 3c. All three images 300, 310, 320 displayed by the display may be augmented with textures and haptic effects that are described in more detail below.

In an embodiment, algorithms may be used to modulate the intensity of a texture over the planar surface of the display. In an embodiment, the intensity of the texture at different locations of the display may be specified by using a grayscale bitmap or a single channel of a color bitmap (e.g., the transparency channel of an ARGB bitmap). The bitmap may be produced in several ways. In an embodiment, the bitmap may be produced manually using image editing or painting tools, such as ADOBE® PHOTOSHOP®. In an embodiment, the bitmap may be produced by applying image processing techniques to a source image, such as conversion to grayscale or edge detection. In an embodiment, both approaches may be combined to process a source image and the results may be manually edited, for example, by exaggerating some features. Other embodiments may include software algorithms that approximate three dimensional (3D) shapes of images by observing a video data stream, instead of using dedicated hardware.

Figure 4:
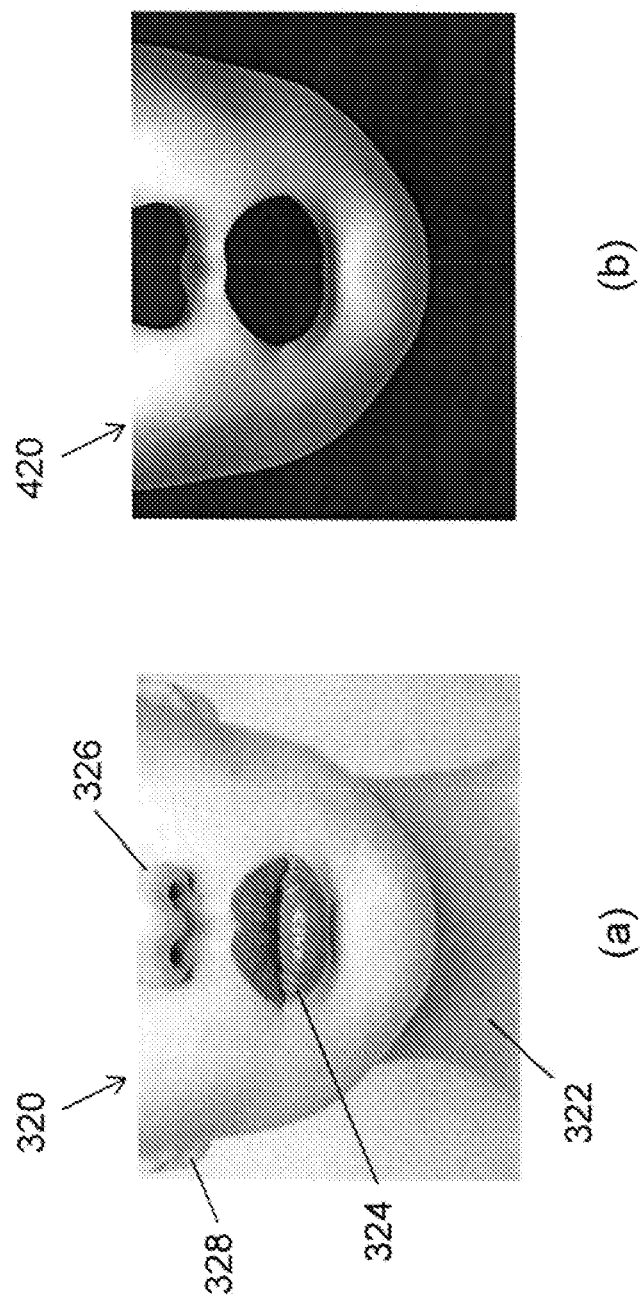
FIG. 4 illustrates an embodiment of texturing of a face image using a grayscale mask, including (a) a source image, and (b) a grayscale mask corresponding to the source image.

FIG. 4b illustrates an example of a grayscale mask 420 that is produced by extracting the brightness information from the image of the partial face 320 of FIG. 4a and manually segmenting away parts of the image, such as the neck 322, lips 324, nose 326, and ears 328. The extent and intensity of a textured area may also be specified using vector graphics primitives, such as rectangles, circles and polygons. This may be done either programmatically, e.g., by specifying areas to be textured in source code, or through vector graphics languages such as Scalable Vector Graphics (SVG) and editors such as ADOBE® ILLUSTRATOR® and INKSCAPE®.

Figure 5:
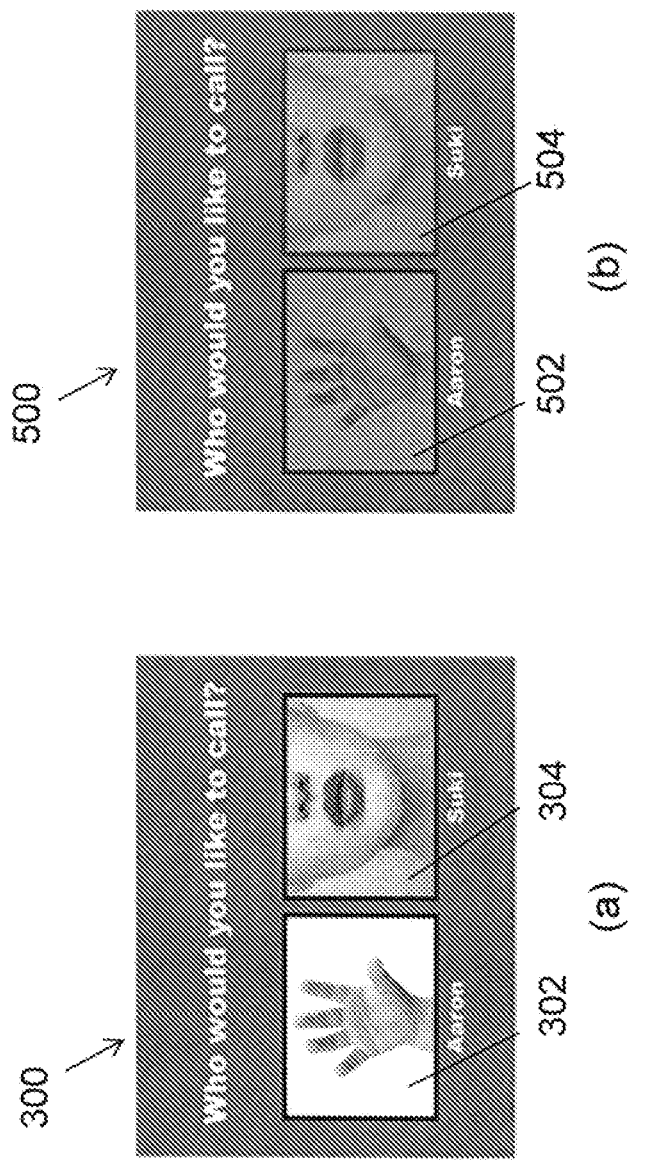
FIG. 5 illustrates an embodiment of texturing through vector graphics primitives, including (a) a source image, and (b) texture regions corresponding to the source image.

FIG. 5b shows an example 500 in which the two rectangular regions 302, 304 of the image 300 in FIG. 5a have been programmatically marked for texturing, as represented by 502, 504 in FIG. 5b, respectively. In an embodiment, the rendering of the texture may be done by selecting the texture intensity according to the mask intensity at the touch location each time a touch event is generated, or each time the haptic output is updated. In an embodiment, this may occur every 30-45 ms. In an embodiment, the rendering of the texture may be done by subsampling to produce a more accurate intensity transition by simulating motion between sequential touch inputs. For example, a haptic texture updated at time T could reproduce an intensity profile that took place between the touch inputs $X_{T-1}$ and $X_T$.

Other methods using bitmaps to produce textured areas may be used. The embodiments described herein are not intended to be limiting in any way. For example any of the methods and systems described in U.S. patent application Ser. No. 12/696,893, titled "Systems and Methods for Providing Features in a Friction Display", filed on Jan. 29, 2010, and published on Sep. 16, 2010 as U.S. Patent Application Publication No. 2010/0231367, which is incorporated herein by reference in its entirety, may be used.

In addition, any of the methods and/or systems described in U.S. patent application Ser. No. 12/697,010, titled "Systems and Methods for a Texture Engine", filed on Jan. 29, 2010, and published on Sep. 16, 2010 as U.S. Patent Application Publication No. 2010/0231540; U.S. patent application Ser. No. 12/697,042, titled "Systems and Methods for Using Multiple Actuators to Realize Textures", filed on Jan. 29, 2010, and published on Sep. 16, 2010 as U.S. Patent Application Publication No. 2010/0231508; U.S. patent application Ser. No. 12/697,037, titled "Systems and Methods for Using Textures in Graphical User Interface Widgets", filed on Jan. 29, 2010, and published on Sep. 16, 2010 as U.S. Patent Application Publication No. 2010/0231541; U.S. patent application Ser. No. 12/696,900, titled "Systems and Methods for Friction Displays and Additional Haptic Effects", filed on Jan. 29, 2010, and published on Sep. 16, 2010 as U.S. Patent Application Publication No. 2010/0231550; and U.S. patent application Ser. No. 12/696,908, titled "Systems and Methods for Interfaces Featuring Surface-Based Haptic Effects", filed on Jan. 29, 2010, and published on Sep. 16, 2010 as U.S. Patent Application Publication No, 2010/0231539, all of which are incorporated herein by reference in their entireties, may be used to produce textured areas for use with embodiments of the present invention.

In an embodiment, rendering primitives, such as the combination of sinusoidal patterns and the use of randomness to create stochastic textures, as described in U.S. patent application Ser. No. 13/665,526, titled "Method and Apparatus for Simulating Surface Features on a user Interface with Haptic Effects" and filed on Oct. 31, 2012, which is incorporated herein by reference in its entirety, may be used with embodiments of the present invention.

In an embodiment, spatial textures may be generated to represent more realistic textures, such as human skin. In an embodiment, the frequency of temporal textures described in U.S. patent application Ser. No. 13/665,526, titled "Method and Apparatus for Simulating Surface Features on a user Interface with Haptic Effects" and filed on Oct. 31, 2012, which is incorporated herein by reference in its entirety, may be modulated to match the velocity of the touch input to generate a spatial texture. In an embodiment, a piecewise waveform based on the movement of the touch input instead of time may be continuously produced to generate a spatial texture. In both embodiments, an illusion of sliding over a spatial grating may be produced with a square waveform. If the movement of the finger on the touch screen is horizontal movement, a horizontal grating may be produced.

In an embodiment, arbitrary spatial patterns, periodic or non-periodic may be generated. In an embodiment, the spatial pattern may be generated by the superposition of spatial sinusoidal textures based on the absolute motion of the touch input. On each touch event, the absolute distance traveled by the touch input may be computed and added to the position within the spatial sinusoidal texture. The result is a sinusoidal texture that changes with movement against the screen, irrespective of its direction. This may result in more realistic textures.

In an embodiment, the properties of a texture may be modulated based on direction of motion on the touch screen to reinforce gradients on, for example, the face image. For example, when moving towards the horizontal center of the image, the finger may be assumed to move against gravity and the full texture may be felt. When moving away from the center, the finger may be assumed to fall down against the face and the texture may be felt at half the intensity.

In an embodiment, the height map for an image may be obtained by using three dimensional (3D) sensors (e.g., MICROSOFT® KINECT®), by image processing (e.g., shape from shading), or by manually coding different image locations. The rendering software may then analyze the gradients of the 3D surface and modulate the intensity of the texture accordingly, such as by increasing intensity of the texture for sharp upward slopes and reducing the intensity of the texture for downward slopes. In an embodiment, bitmaps or vector graphics may also be used to specify different texture masks as a function of direction, for example, with interpolation between discrete mask sets.

In an embodiment, the combination of sinusoidal signals via superposition may be used to create the haptic effect. In an embodiment, two sinusoidal signals may be multiplied together, instead of adding them, which may result in a low-frequency envelope on a high-frequency effect, which provides a distinctly different haptic effect.

In an embodiment, edge effects may be used to simulate the edge of the image being displayed on the touch screen. In an embodiment, an edge effect may be produced by setting the electrostatic friction output to the maximum voltage for a short period of time (~50 ms). In an embodiment, an edge effect may be produced by muting the existing electrostatic friction output. In an embodiment, an edge effect may be reinforced by using texture masks.

Figure 6:
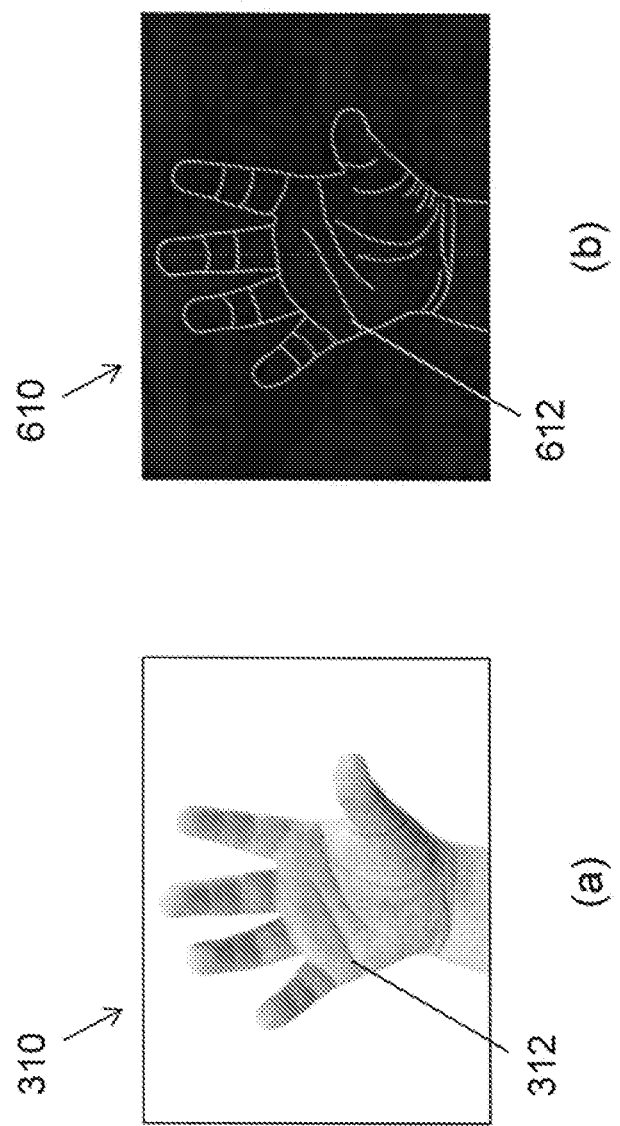
FIG. 6 illustrates an embodiment of an edge map, including (a) a source image, and (b) an edge map with different intensities corresponding to the source image.

Much like textures, edges may be specified either with bitmaps or vector graphics. In an embodiment, the location of edges may be marked in a bitmap either a grayscale image or a channel of a color image. Such an edge map may be produced either automatically, for example, by using an edge detection algorithm, or manually, for example, by using an image editor. FIG. 6 illustrates an embodiment in which an edge map 610, as shown in FIG. 6b, was produced by manually tracing the contours of the image of the hand 310 of FIG. 6a.

In an embodiment, a collision detection algorithm may be used on each touch event with the image on the touch screen. In an embodiment, the algorithm may take the following form. For example, if it is determined that the previous position of the user's finger was over an edge but its current position is not over an edge, an edge effect should be produced. If it is determined that the current position of the user's finger is over an edge but its previous position was not over an edge, an edge effect should not be produced, because user's finger has just entered an edge. If it is determined that both positions are over an edge, an edge effect should not be produced, because the user's finger is within an edge. If it is determined that both positions are not over an edge, each pixel should be checked in a straight line from the previous position to the current position. If any pixel is over an edge, an edge effect should be produced, because the user's finger has crossed an edge.

In an embodiment, the intensity of the edge effect may correspond to the grayscale intensity of the edge that has been crossed in the edge map. In an embodiment, edges may be specified using vector graphics primitives, such as lines, circles and polygons. Algorithms from computational geometry may then be used to efficiently perform collision detection. In an embodiment, creases 312 on the hand 310 of FIG. 6a may be represented as a set of short lines 612 in the edge map 610 of FIG. 6b and tested for crossing using a simple line intersection algorithm.

Figure 7:
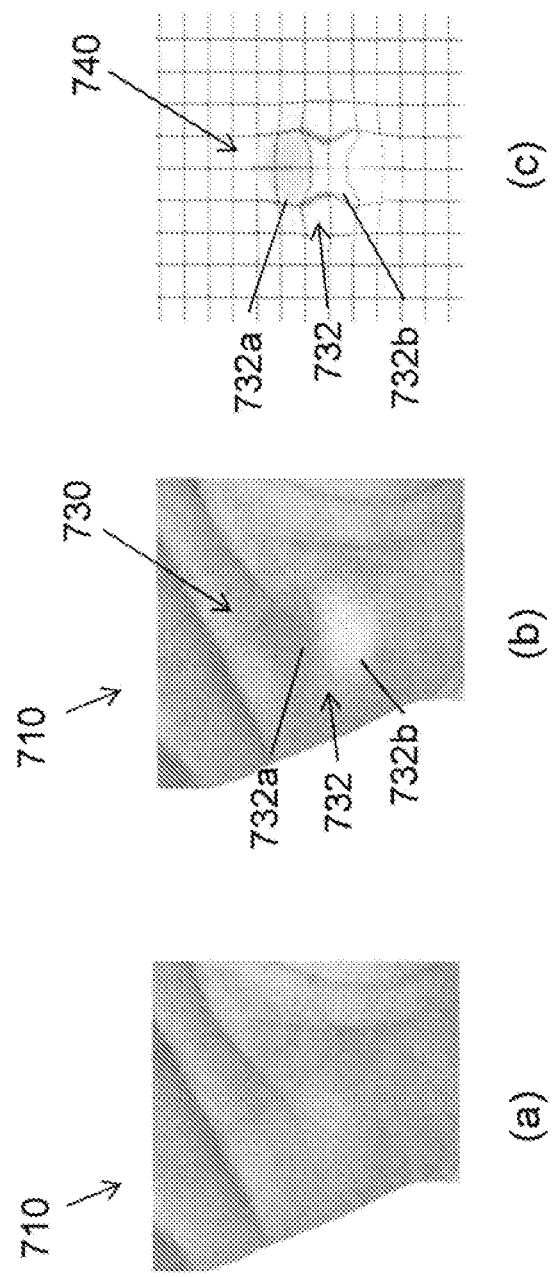
FIG. 7 illustrates an embodiment of a visual distortion of the image at the touch input, including (a) a source image, (b) a distorted source image, and (c) a distortion of a grid corresponding to the distorted source image.

In an embodiment, the image of the hand and face may be visually distorted around the touch input in order to reinforce the illusion of interacting with a real object. An example of this is illustrated in FIG. 7. FIG. 7a illustrates a partial image 710 of the hand 310, FIG. 7b illustrates a touch 730 on the hand 310, and FIG. 7c illustrates a graphical representation 740 of the touch 730 on the hand 310 of FIG. 7b.

In the illustrated embodiment of FIG. 7, the visual effect consists of two components. First, the pixels within a radius of 50 pixels may be remapped as a function of their distance to the touch input. The pixels are "pinched" towards the center and "pushed out" near the outer rim, as illustrated in FIG. 7c. Second, a shadow representative of the touch 730 and in the form of a deformed disc 732 may be added to the touch input. The shadow is exaggerated in FIGS. 7b and 7c for clarity. The shadow is darkened at the top 732a of the deformed disc 732 and lightened at the bottom 732b of the deformed disc 732, as shown in FIGS. 7b and 7c. As illustrated, the effect fades away gradually near the edges of the shadow.

Figure 8:
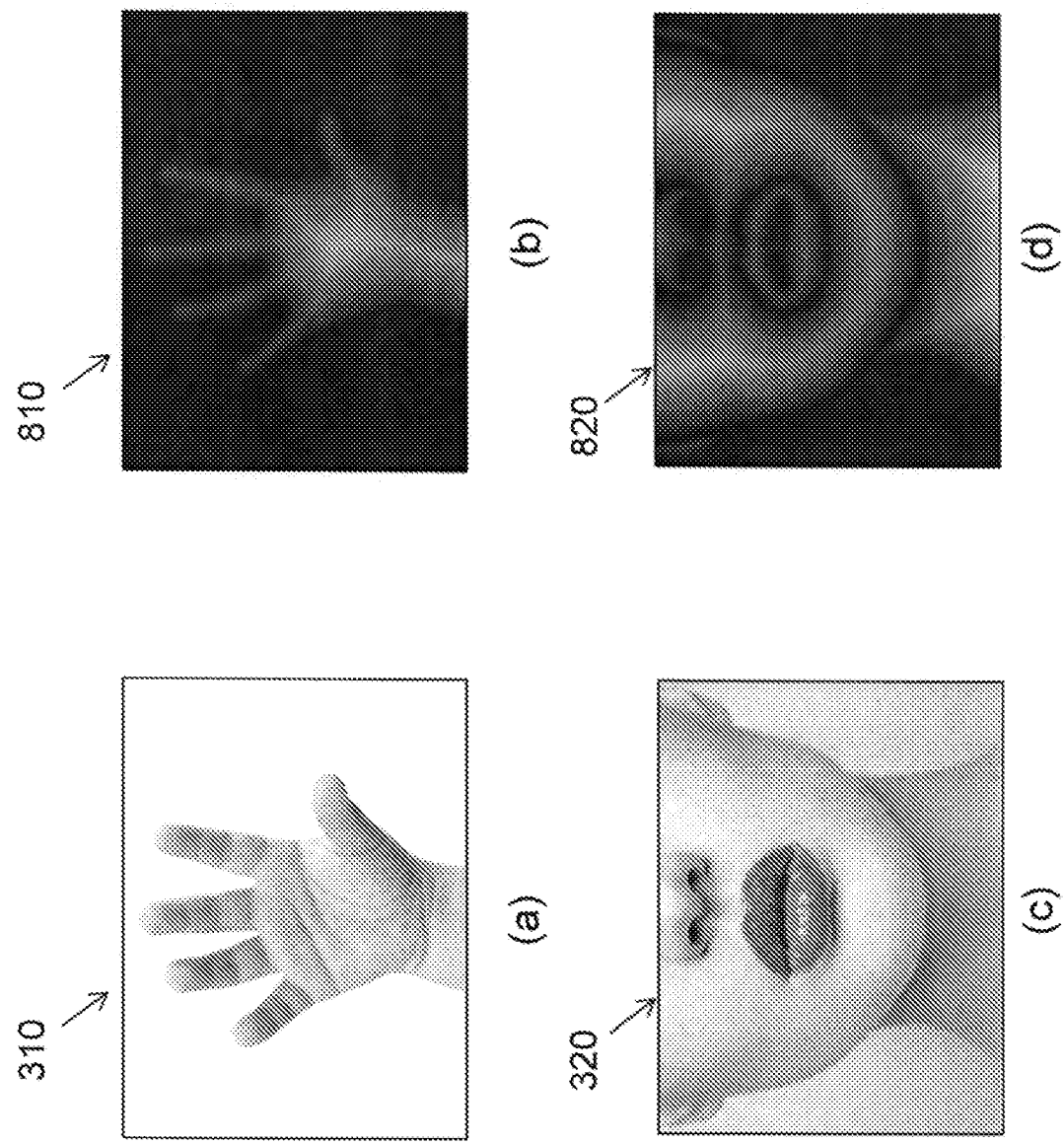
FIG. 8 illustrates embodiments of computations of allowable distortion radii, including (a) and (c) source images and (b) and (d) distances from edges of the source images, respectively.

In order to prevent unrealistic deformations, such as at the edge of the hand 310 or the face 320, the radius of the deformation filter may be reduced as the touch input nears the edge of the objects. This may be done by computing the minimal distance from the nearest edge at every point in the image, as shown in FIG. 8. For example, FIG. 8b shows an image 810 of the hand 310 of FIG. 8a that represents the minimal distance from the nearest edge at every point in the image, with the brighter portions of the image indicating the larger distances from the nearest edge. Similarly, FIG. 8d shows an image 820 of the face 320 of FIG. 8c, with the brighter portions of the image indicating the larger distances from the nearest edge.

In operation, the user of the device may be presented with the image 300 of the contacts screen of FIG. 3a, which shows two contacts. The user may choose which contact to call by tapping on either the corresponding image or name. The user may also feel the content of the screen. For example the two images 310, 320 may be provided with an electrostatic friction effect by being covered with a 50-Hz square temporal sinusoid and a 50-ms edge effect upon entering or leaving the pictures. The names may be covered with a horizontal spatial grating having a spatial wavelength of 50 pixels.

Figure 3:
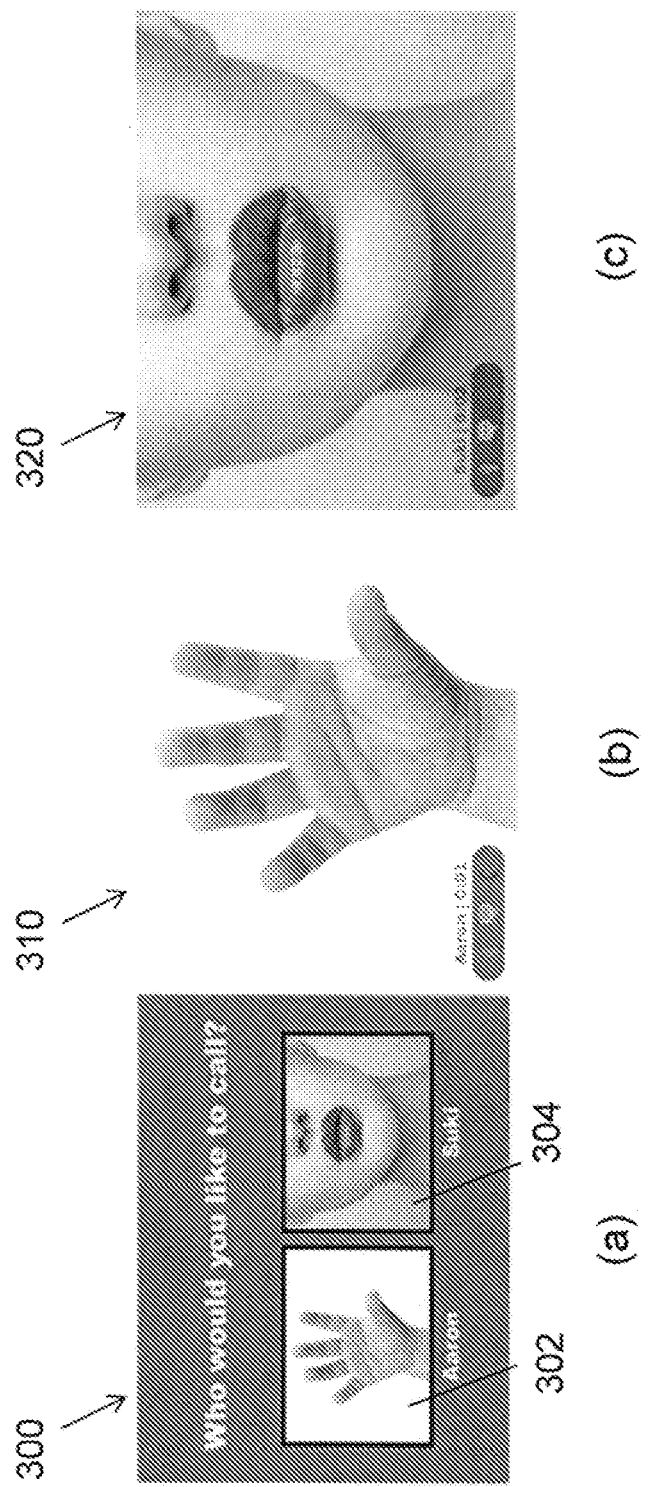
FIG. 3 illustrates an embodiment of images that may be displayed by the electronic device of FIG. 1, including (a) a contacts screen, (b) a hand, and (c) a face.

In an embodiment, the images of FIG. 3 may feel like their content when the user touches the images, as described below. In addition, the header text, "Who would you like to call?" in FIG. 3a, may also be covered with a grating texture.

In the illustrated embodiment, the Aaron contact is associated with the image 310 showing the hand of a toddler, as shown in FIG. 3b. As illustrated more clearly in FIG. 9, the screen displaying the image 310 of the hand also shows a widget 902 in the lower-left corner that includes text 910 indicating the name of the contact and the current duration the call. The widget 902 also includes three buttons 904, 906, 908. In an embodiment, one of the buttons 904 may be configured to toggle the haptic effects on and off. The other buttons 906, 908 may be configured to provide other functionalities, such as to end a call and/or return to the contacts screen of FIG. 3a.

Figure 9:
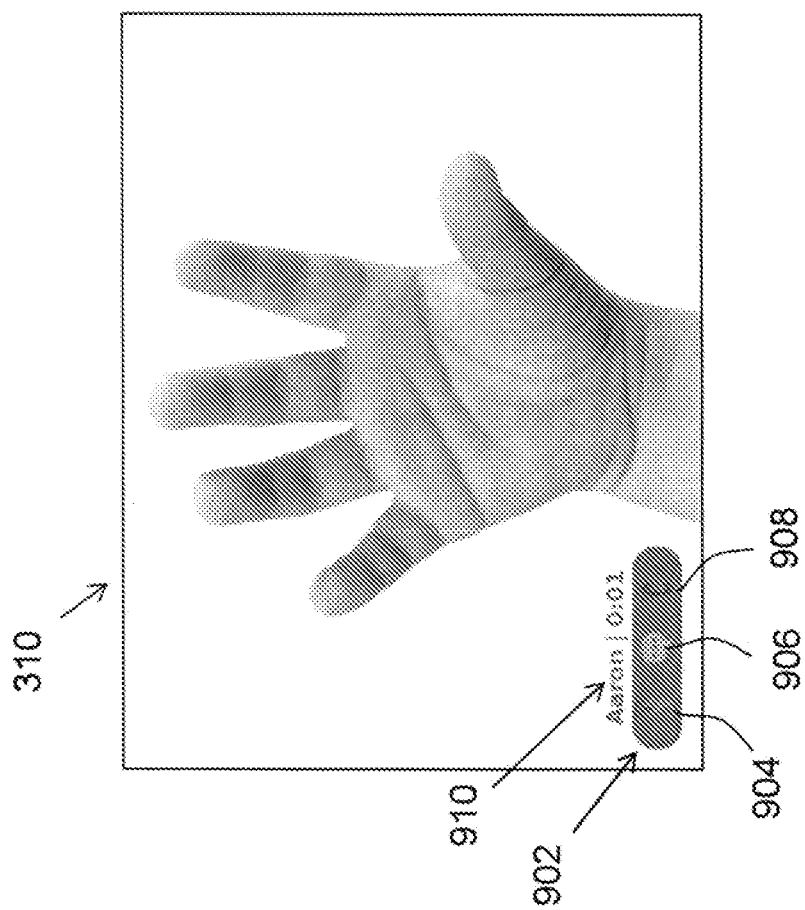
FIG. 9 illustrates a more detailed view of FIG. 3*b*.
Figure 10:
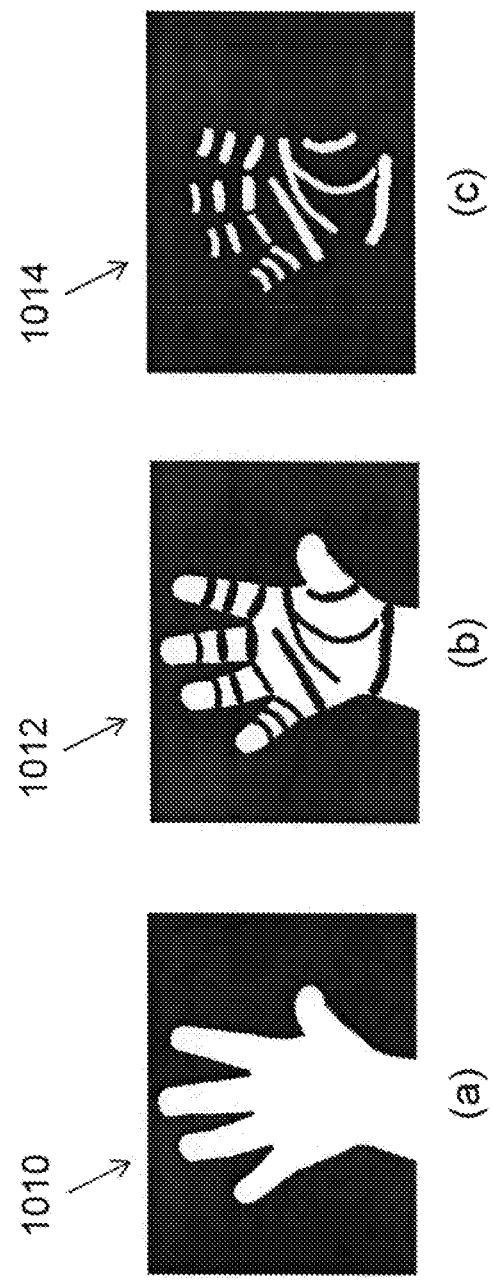
FIG. 10 illustrates embodiments of texture masks for the image of FIG. 9, including (a) a complete hand, (b) a hand without creases, and (c) creases.

FIG. 10 illustrates different texture masks that may be used with the hand image 310 of FIG. 9. In an embodiment, a single texture 1010 may be used for the entire hand, as shown in FIG. 10a. This texture may consist of a spatial sinusoid with a wavelength of 12 pixels, at 70% intensity, for example. In an embodiment, different textures may be assigned to the creases 1014 of the hand (FIG. 10c) and other regions 1012 of the hand (FIG. 10b).

Figure 11:
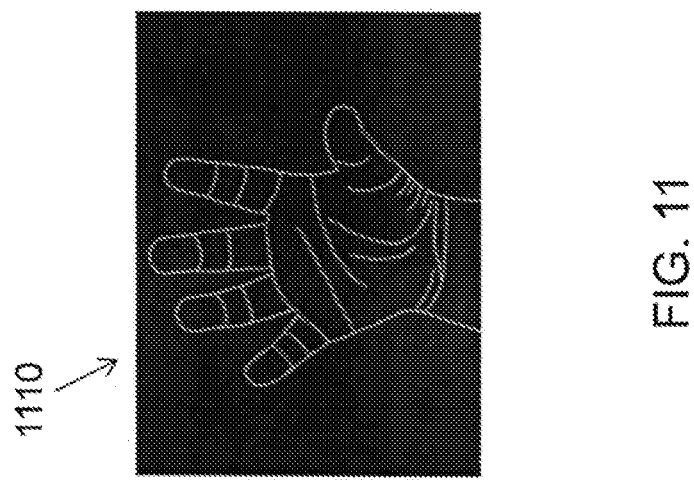
FIG. 11 illustrates a embodiment of edges of the hand image of FIG. 9.

FIG. 11 illustrates an embodiment of an edge map 1110 that corresponds to the hand image 310 of FIG. 9. In an embodiment, a 50-ms edge effect may be played whenever the touch input crosses a non-zero region, with an intensity corresponding to the grayscale value of the crossed edge.

Figure 12:
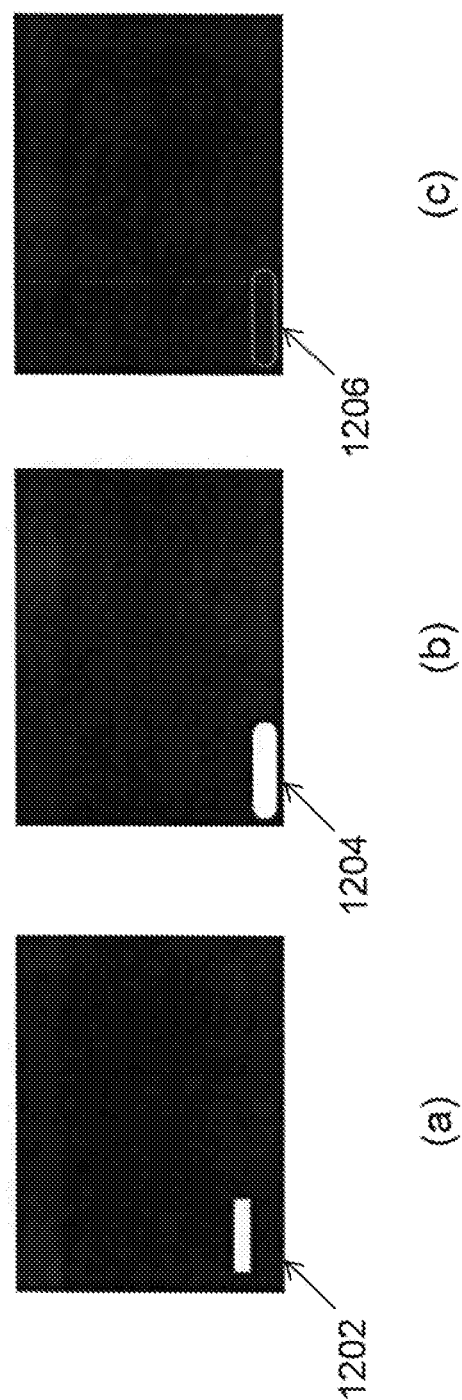
FIG. 12 illustrates embodiments of texture masks and an edge map for a communication widget texture mask for (a) text and (b) buttons, and (c) edge map.

The communication widget 902 in the lower-left corner of FIG. 9 may also be augmented with textures and edge effects. The text 910 may be delimited by a rectangular mask 1202, as shown in FIG. 12a, and rendered with a spatial grating having a spatial wavelength of 50 pixels. The buttons 904, 906, 908 may be similarly delimited by a mask 1204, as shown in FIG. 12b, with a temporal square effect at 50 Hz. A 50-ms edge effect may also be felt when entering or leaving the button bar, according to an edge map 1206 shown in FIG. 12c.

Figure 13:
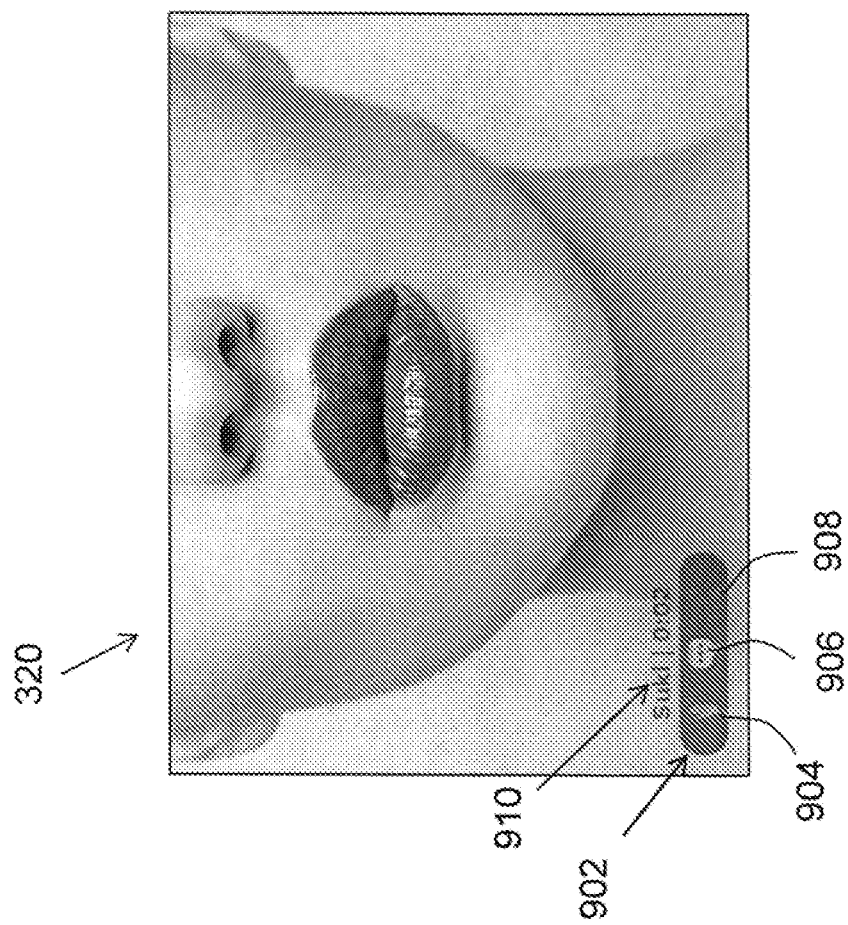
FIG. 13 illustrates a more detailed view of FIG. 3*c*.

In the illustrated embodiment, the Suki contact is associated with the image of a partial female face 320, as illustrated in FIG. 13. The communication widget 902 is once again available in the lower-left corner, and may be augmented with the same haptic feedback as for the hand screen of FIG. 9, as discussed above.

Figure 14:
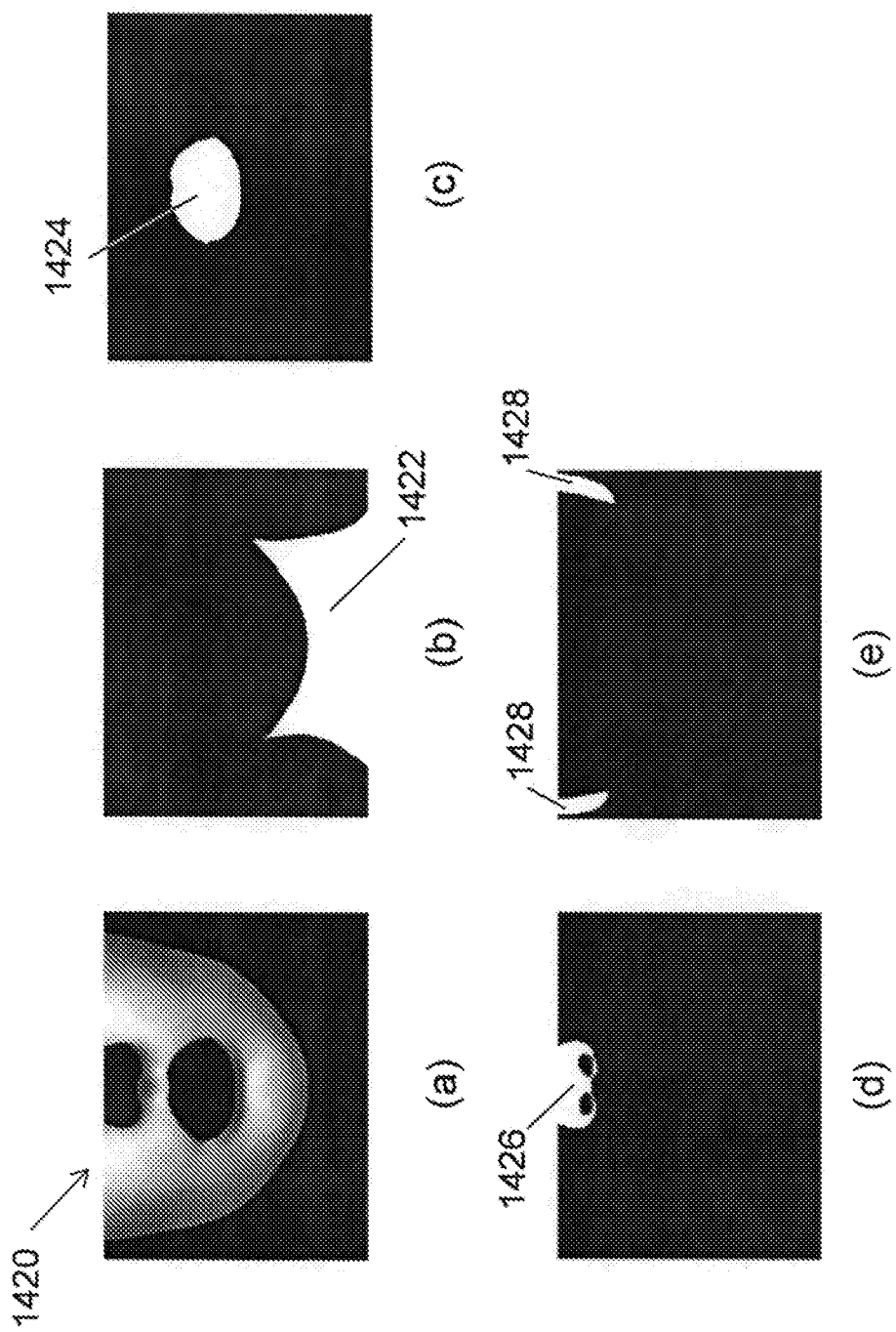
FIG. 14 illustrates embodiments of texture masks for the image of FIG. 13, including (a) a face, (b) a neck, (c) a mouth, (d) a nose, and (e) ears.

FIG. 14 illustrates embodiments of the texture masks that may be used for the face image 320. The main part of the face may be textured according to a grayscale mask 1420 varying with the intensity of the original image (FIG. 14a). The texture may be generated with, for example, a spatial sinusoid having a wavelength of 5 pixels and an intensity of 75%. In order to reinforce the gradient, the intensity may be halved when moving away from the horizontal center of the image. The neck 1422, illustrated in FIG. 14b may be similarly textured with, for example, a directional sinusoid having a spatial wavelength of 10 pixels and an intensity of 50%. The mouth 1424, illustrated in FIG. 14c, may be textured with, for example, a temporal sinusoid having a frequency of 50 Hz and an intensity of 50%. The nose 1426, illustrated in FIG. 14d, and the ears 1428, illustrated in FIG. 14e, may be textured with, for example, a 500-Hz sinusoid at 30% intensity.

Figure 15:
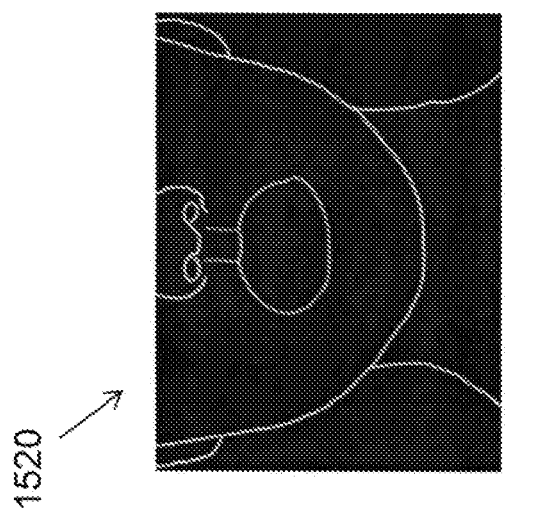
FIG. 15 illustrates an embodiment of an edge map of the face image of FIG. 13.

FIG. 15 illustrates an embodiment of an edge map 1520 for the face image 320. In an embodiment, a 50-ms edge effect may be felt whenever crossing a non-zero region on the edge map, with an intensity corresponding to the grayscale value of the crossed edge. In an embodiment, certain features, such as the lips, may have lower intensity.

Embodiments of the invention described herein may be used with any electronic device that includes a display and a user interface that includes a haptic output device. For example, two people may participate in a video conferencing session with systems and methods according to embodiments of the present invention.

Figure 16:
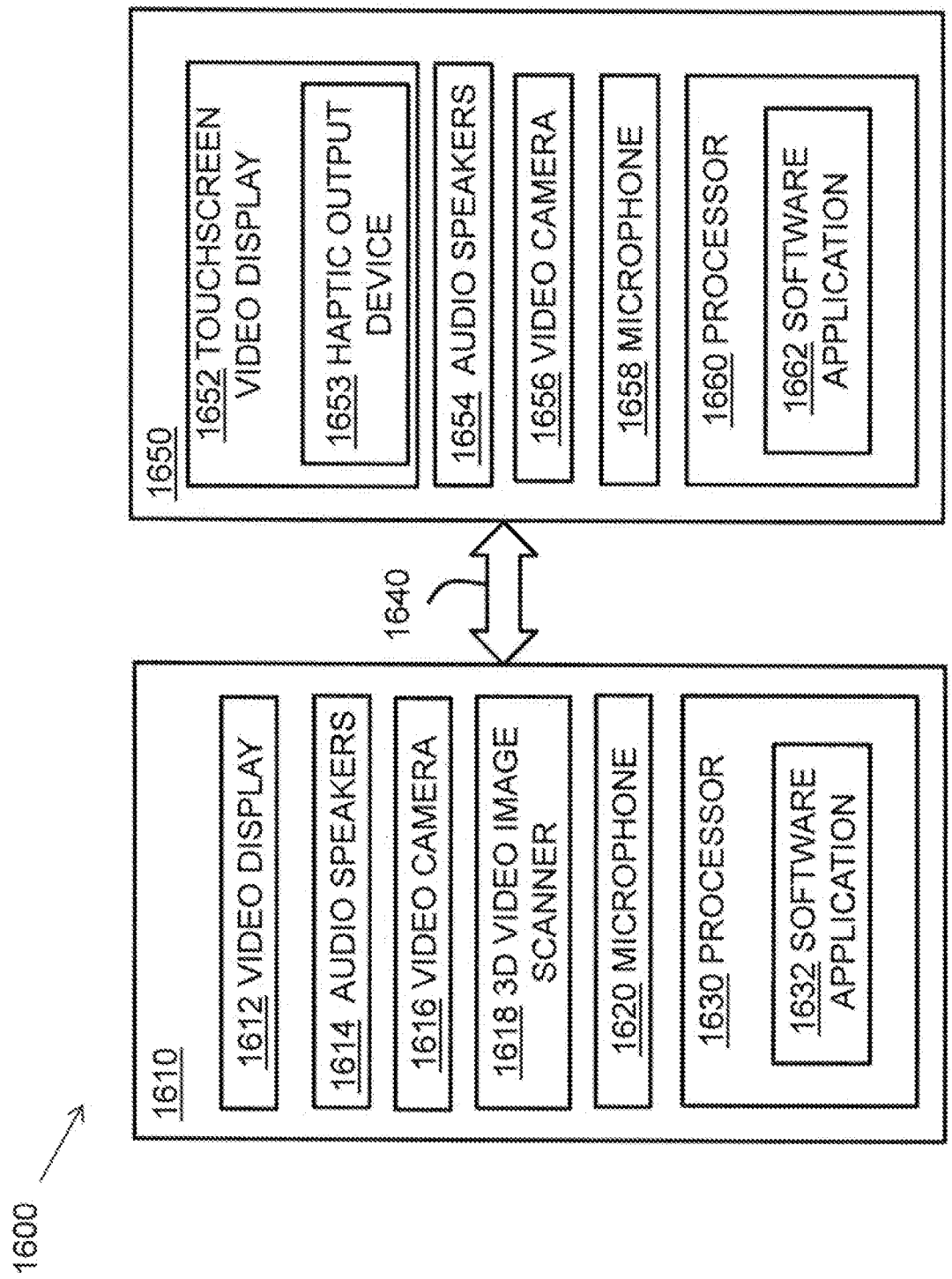
FIG. 16 is a schematic illustration of a system according to embodiments of the invention.

An embodiment of a video conferencing system 1600 is illustrated in FIG. 16. For example, a first person may use a first system 1610 located at a first location. In the illustrated embodiment, the first system 1610 includes a video display 1612, audio speakers 1614, a video camera 1616, a 3D video image scanner 1618 (such as the MICROSOFT® KINECT®), a microphone 1620, a processing unit 1630, and a software application 1632 running on the processing unit 1630 that enables videoconferencing. The first system 1610 is configured to connect and transmit/receive data to/from a second system 1650 used by a second person at a second location on the other end of the videoconference via a suitable communication system 1640. The processing unit 1630 may be configured to capture images, sound, and a 3D representation of the first person's face, head, and shoulders through the video camera 1616, the 3D video image scanner 1618, and the microphone 1620. The video, 3D representation of the video, and sound may be transmitted to the second system 1650 through the communication system 1640.

In the illustrated embodiment, the second system 1650 includes a touchscreen video display 1652 that incorporates embodiments of the surface friction modulation technology described above. The touchscreen video display 1652 includes a haptic output device 1653 configured to output a haptic effect in accordance with embodiments of the invention described herein. The second system 1650 may also include audio speakers 1654, a video camera 1656, a microphone 1658, a processing unit 1660, and a software application 1662 running on the processing unit 1660 that enables videoconferencing. The second system 1650 is configured to connect and transmit/receive data to/from the first system 1610 through the communication system 1640.

In the second system 1650, the software application 1662 may be configured to transform the 3D representation of the first person's face, head and shoulders into a friction gradient map, which may be used to drive the friction display such that any 3D shape discontinuities, such as the edges of the first person's body outline, nose, lips, eyebrows, etc. may be represented as higher friction areas on the touchscreen video display 1652. In an embodiment, video stream analysis software may be included in the software application 1662 and may be used to determine approximate 3D shapes of images being streamed through the communication system 1640. In an embodiment, image pixels may be analyzed to approximate the haptic effect by using software algorithms that approximate 3D shapes of images by observing the video data stream. In an embodiment, a transform may be applied to the first person's 3D representation such that there is a relationship between the local curvature of the first person's physical features, and the electrostatic friction applied by haptic output device 1653 of the touchscreen display 1652 when the second person runs a finger across the video image of the first person that is displayed by the touchscreen video display 1602.

In this way, during the videoconference call, the second person may reach out and feel the first person's body outline, nose, chin, shoulder, etc., and the second system 1650 according to embodiments of the present invention may convey a higher degree of "tele-presence" than a system without embodiments of the present invention.

Figure 17:
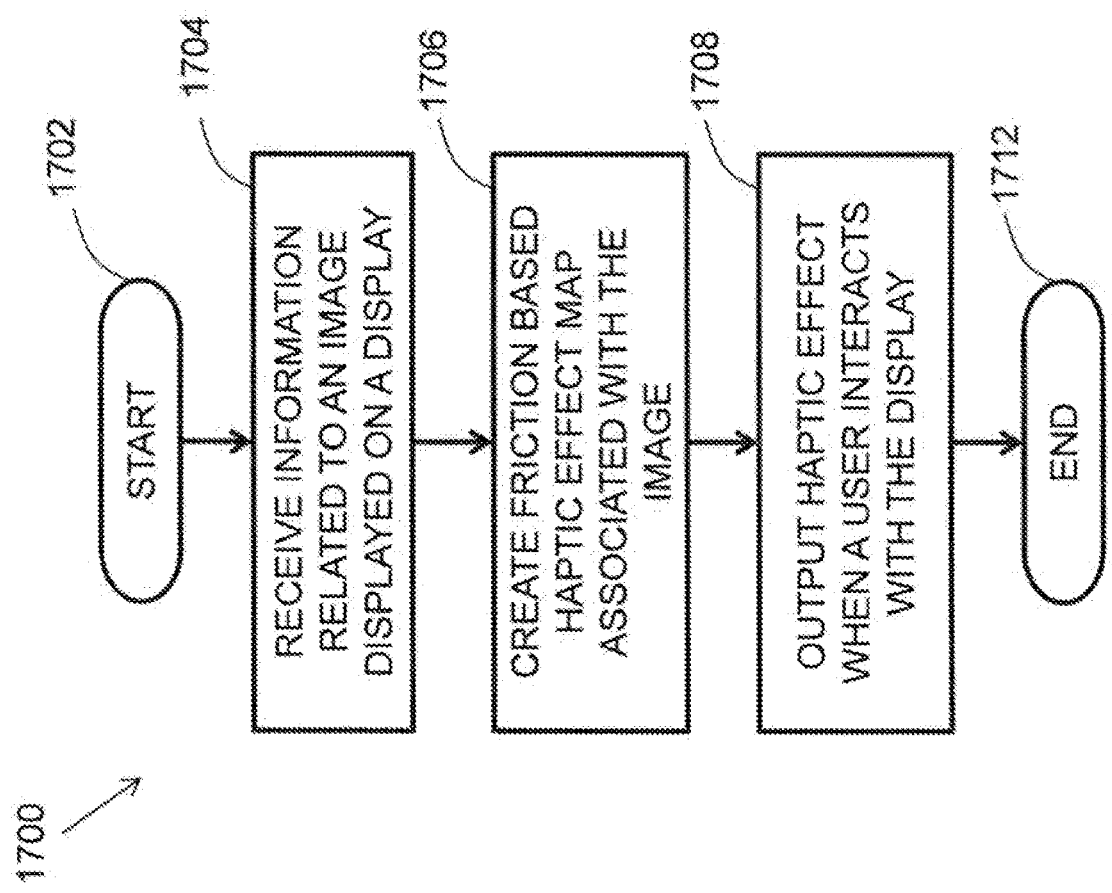
FIG. 17 is a flow diagram of a method according to an embodiment of the invention.

The embodiments disclosed herein are not intended to be limiting in any way. For example, the videoconferencing embodiment is provided to illustrate an asymmetric system set-up. In another embodiment, the first system 1610 and the second system 1650 are identical systems so that both parties have access to the complete suite of technologies described herein, FIG. 17 illustrates a method 1700 in accordance with embodiments of the invention. As illustrated in FIG. 17, the method 1700 starts at 1702. At 1704, information related to an image on a display is received by a processor. At 1706, a friction based haptic effect map that is associated with the information related to the image that was received by the processor is created by the processor. At 1708, the processor outputs a signal to a haptic output device to generate a haptic effect to a user when the user interacts with the display with, for example, a finger or stylus. The haptic effect that is generated corresponds to the image being displayed on the display so that the user senses a 3D representation of the image being displayed. As the image changes on the display, the method may return to 1704. The method ends at 1712.

FIG. 18 illustrates a method 1800 in accordance with embodiments of the invention. As illustrated in FIG. 18, the method 1800 starts at 1802. At 1804, a video stream comprising images is received. At 1806, the video stream is analyzed and three-dimensional shapes of the images being received in the video steam are approximated. At 1808, haptic effects based on the three-dimensional shapes of the images are generated. The method may return to 1804 as long as the video steam is being received. The method ends at 1812.

Embodiments of the present invention may be used to enable haptic feedback in various electronic devices, such as touch screen handheld devices (mobile devices, PDA, and navigation systems), automotive applications, gaming consoles, etc.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A haptic device comprising:
a haptic output device configured to output a haptic effect;
a processing device communicatively coupled to the haptic output device configured to simulate a spatial texture of an image or a spatial texture of a contour of the image;
a memory communicatively coupled to the processing device, the memory comprising program code that is executable by the processing device to cause the processing device to:
detect an interaction with a virtual object in a virtual environment, the interaction comprising a movement relative to the virtual object;
select a haptic-effect map from among a plurality of haptic-effect maps based on a direction of the movement relative to the virtual object, each haptic-effect map among the plurality of haptic-effect maps specifying intensities of the haptic effect at different locations in the virtual environment; and
adjust an intensity of the haptic effect based on the selected haptic-effect map.

2. The haptic device of claim 1, wherein the haptic effect comprises electrostatic friction or ultrasonic vibration.

3. The haptic device of claim 1, further comprising a touch sensitive surface, wherein the movement is across the touch sensitive surface.

4. The haptic device of claim 1, wherein the virtual object includes a surface feature comprising a texture, spatial pattern, edge, or border, and the haptic effect is configured to simulate a feel of the surface feature of the virtual object.

5. The haptic device of claim 1, wherein the memory further comprises program code that is executable by the processing device to cause the processing device to:
modify the intensity of the haptic effect to simulate a first gravitational effect when the direction of the movement is a first direction and a second gravitational effect when the direction of the movement is a second direction that is opposite to the first direction.

6. The haptic device of claim 1, wherein the direction of the movement relative to the virtual object comprises moving towards or away from a portion of the virtual object.

7. The haptic device of claim 1, wherein the memory further comprises program code that is executable by the processing device to cause the processing device to:
identify a plurality of gradients associated with a surface of the virtual object;
determine a gradient, from among the plurality of gradients, based on the direction of the movement; and
modify the intensity of the haptic effect based in part on the gradient.

8. The haptic device of claim 1, further comprising a touchscreen display communicatively coupled to the processing device, wherein the memory further comprises program code that is executable by the processing device to cause the processing device to:
display the virtual environment on the touchscreen display, the virtual environment comprising a graphical user interface.

9. The haptic device of claim 1, further comprising a camera communicatively coupled to the processing device, wherein the memory further comprises program code that is executable by the processing device to cause the processing device to:
receive an image from the camera, the image comprising an object; and
generate the virtual environment based on the image, the virtual environment comprising a graphical representation of the object that includes the virtual object.

10. The haptic device of claim 9, wherein the haptic effect is configured to simulate a contour of the virtual object, and the virtual object comprises a graphical representation of an inanimate object.

11. A method comprising:
detecting, by a processing device, an interaction with a virtual object in a virtual environment, the interaction comprising a movement relative to the virtual object;
selecting, by the processing device, a haptic-effect map from among a plurality of haptic-effect maps based on a direction of the movement relative to the virtual object, each haptic-effect map among the plurality of haptic-effect maps specifying intensities of a haptic effect at different locations in the virtual environment;

adjusting, by the processing device, an intensity of the haptic effect based on the selected haptic-effect map; and outputting and modulating the haptic effect based at least in part on the selected haptic-effect map, the haptic effects configured to simulate a spatial texture of the virtual object or a spatial texture of a contour of the virtual object.

12. The method of claim 11, wherein the haptic effect comprises electrostatic friction or ultrasonic vibration.

13. The method of claim 11, wherein the virtual object includes a surface feature comprising a texture, spatial pattern, edge, or border, and the haptic effect is configured to simulate a feel of the surface feature of the virtual object.

14. The method of claim 11, further comprising:
modifying the intensity of the haptic effect to simulate a first gravitational effect when the direction of the movement is a first direction and a second gravitational effect when the direction of the movement is a second direction that is opposite to the first direction.

15. The method of claim 11, further comprising:
identifying a plurality of gradients associated with a surface of the virtual object;
determining a gradient, from among the plurality of gradients, associated with the direction of the movement; and
modifying the intensity of the haptic effect based in part on the gradient.

16. The method of claim 11, further comprising:
receiving, by the processing device, an image from a camera, the image comprising an object; and
generating, by the processing device, the virtual environment based on the image, the virtual environment comprising a graphical representation of the object that includes the virtual object.

17. A non-transitory computer-readable medium comprising program code that is executable by a processing device to cause the processing device to:

detect an interaction with a virtual object in a virtual environment, the interaction comprising a movement relative to the virtual object;

select a haptic-effect map from among a plurality of haptic-effect maps based on a direction of the movement relative to the virtual object, each haptic-effect map among the plurality of haptic-effect maps specifying intensities of a haptic effect at different locations in the virtual environment;

adjust an intensity of the haptic effect based on the selected haptic-effect map; and output and modulate the haptic effect based at least in part on the selected haptic-effect map, the haptic effect configured to simulate a spatial texture of the virtual object or a spatial texture of a contour of the virtual object.

18. The non-transitory computer-readable medium of claim 17, wherein the movement is across a touch sensitive surface, and the haptic effect comprises electrostatic friction or ultrasonic vibration.

19. The non-transitory computer-readable medium of claim 17, further comprising program code that is executable by the processing device to cause the processing device to:
identify a plurality of gradients associated with a surface of the virtual object;
determine a gradient, from among the plurality of gradients, based on the direction of the movement; and
modify the intensity of the haptic effect based in part on the gradient.

20. The non-transitory computer-readable medium of claim 17, further comprising program code that is executable by the processing device to cause the processing device to:
receive an image from a camera, the image comprising an object; and
generate the virtual environment based on the image, the virtual environment comprising a graphical representation of the object that includes the virtual object.

* * * * *